United States Patent

Maier

[15] 3,681,701

[45] Aug. 1, 1972

[54] FILTERING METHOD AND A CIRCUIT ARRANGEMENT FOR CARRYING OUT THE FILTERING METHOD

[72] Inventor: Karl Maier, Stuttgart, Germany

[73] Assignee: International Standard Electric Corporation, New York, N.Y.

[22] Filed: Nov. 16, 1970

[21] Appl. No.: 89,609

[30] Foreign Application Priority Data

Nov. 27, 1969 Germany .............P 19 59 515.4
Nov. 27, 1969 Germany .............P 19 59 514.3

[52] U.S. Cl.................328/167, 333/70 A, 179/15 A

[51] Int. Cl.................................................H04b 1/10

[58] Field of Search....328/167; 333/70 A; 179/15 A, 179/15 BC; 178/50

[56] References Cited

UNITED STATES PATENTS

| | | | |
|---|---|---|---|
| 3,061,680 | 10/1962 | Frankel | 333/70 A |
| 3,081,434 | 3/1963 | Sandberg | 328/167 X |
| 3,307,408 | 3/1967 | Thomas et al | 328/167 X |
| 3,508,006 | 4/1970 | Martens | 179/15 BC |
| 3,537,015 | 10/1970 | Jackson | 328/167 |
| 3,564,146 | 2/1971 | Poschenrieder et al | 333/70 A |
| 3,523,380 | 4/1971 | Darlington | 179/15 A |

OTHER PUBLICATIONS

IBM Journal March 1965 " A New Method for Frequency-Division Multiplexing in" by Thrasher

*Primary Examiner*—John S. Heyman
*Attorney*—C. Cornell Remsen, Jr., Walter J. Baum, Paul W. H. Emminger, Charles L. Johnson, Jr., James B. Raden, Delbert P. Warner and Marvin M. Chaban

[57] ABSTRACT

A filtering method and apparatus for passing a desired band of AF signals from a broad band of signals is disclosed. The broad band is periodically integrated over fixed time intervals. An output signal is formed by arranging the integral values in sequence.

19 Claims, 24 Drawing Figures

INVENTOR
KARL MAIER

BY Delbert A. Warner
ATTORNEY

FILTERING METHOD AND A CIRCUIT ARRANGEMENT FOR CARRYING OUT THE FILTERING METHOD

The present invention relates to a filtering method and circuit arrangements for carrying out the method of filtering an A.F. band out of a wide-band input signal in telecommunication, particularly time-division multiplex telephone switching systems. The invention has for its object to attenuate, at a low cost, the undesired frequency band of the input signal to such an extent that no interfering crosstalk is produced during the time interleaving or separation of the channels.

The filtering method according to the invention is characterized in that said input signal is periodically integrated over fixed time intervals, with the duration of said time intervals corresponding either to half the cycle or to a full cycle of a frequency at the attenuation pole besides the desired A.F. band, that said input signal is integrated several times, in each case out of phase in relation to one another by half the duration of said fixed time intervals, that the thus obtained integral values are stored for a half-duration of said fixed time intervals, and that the output signal is formed by arranging the stored integral values in a periodic sequence.

The filtering method according to the invention may be characterized alternatively in that the input signal is periodically integrated over fixed periods of time, with the duration of said periods corresponding to half the cycle of a frequency at the attenuation pole beside the desired A.F. band, that successively obtained integral values are separately stored for the double integration duration, and that the output signal is formed by summation of said stored integral values.

An advantage of the filtering method according to the invention consists in that for its realization no alignment of components (e.g. coils, capacitors, resistors) in the conventional sense is necessary because in this filtering method the attenuation poles are determined by the frequency of the control voltage used for the periodic integration. Thus, it becomes possible, among other things, to realize a circuit arrangement according to the invention for carrying out the filtering method as integrated circuit.

A circuit arrangement of this kind for carrying out the method according to the invention is characterized by 3 integraters to which the input signal is fed out of phase by one half cycle and in each case for a full cycle duration via first electronic, clock-controlled switches, and by second clock-controlled electronic switches via which the output of one integrater is in each case alternately connected to the output of the circuit arrangement during a half cycle after the opening of the associated first switch. During the time difference between the opening of the first switch and the resetting of the integrator, i.e. up to half a cycle, the signal integral is stored in the respective integrator. The resetting of the integrators is also carried out with clock control and out of phase by half a cycle.

Another circuit arrangement for carrying out the method according to the invention is characterized by 2 integrators to which the input signal is fed in parallel and which, out of phase in relation to one another by one half cycle, are reset after each cycle, and by two associated electronic switches via which the signal is transmitted to a storage at the end of each integration cycle, immediately prior to the resetting of the integrator. In this case, the out-of-phase signal integrals are buffered in a separate storage, e.g. a capacitor; thereby, the integrator can be reset immediately, and one integrator can be saved.

Still another circuit arrangement for carrying out the method according to the invention is characterized by an integrator to which the input signal is constantly applied and which is reset by clock control after each of said fixed periods of time, by two buffer stores, to which the integral value is alternately fed via a respectively associated electronic switch shortly before the resetting of said integrator, and by a summing element which forms the output signal from said alternately stored integral values.

These circuit arrangements require no coils, LC oscillators or tuned RC filter networks. The clock pulses necessary for the control are required in centrally controlled telephone systems, particularly in time-division multiplex telephone switching systems, anyway.

It is known to improve the effect of a filter by connecting several stages in series. A feature of the above-mentioned circuit arrangement for carrying out the method according to the invention is characterized in that in a multi-stage filter each terminating summing element of a stage before a following integrator of the next stage is omitted.

The circuit arrangements described above produce an output signal with a frequency response containing mainly the known sin $x/x$ function. A further feature of the invention is characterized in that an equalizer is connected in known manner to the filter stage, which equalizer compensates for the undesired frequency response in the passband.

If several filter stages of equal integration duration are connected in series, the attenuation effect multiplies but bands with smaller attenuation remain at the frequencies between the attenuation poles.

If several filter stages of unequal integration duration are connected in series, the attenuation poles occur at different adjacent frequencies, and in this manner frequency responses can be obtained in which the frequency ranges or bands, between the attenuation poles of the individual filter stages are attenuated more uniformly, too. To this end, however, different control frequencies must be available.

Since the frequency response of the individual filter stages multiplies and no discontinuities of the frequency response occur in the frequency range to be used, a further feature of the invention provides that a common equalizer is connected to a ladder of filter stages.

Another form of compensation for the frequency response of the filter is characterized in that an equalizer is connected in parallel to said filter, and that one input of a summing amplifier is connected to the output of said filter and the other input of said summing amplifier is connected to the output of said equalizer via a coefficient potentiometer.

A circuit arrangement suitable therefor is characterized in that said equalizer is designed as a controlled switch filter in which the input voltage is alternately fed to one of two capacitors with the double frequency of the first attenuation pole and in which a differential amplifier combines the voltages of said capacitors to form the output signal of said equalizer.

The invention will now be explained with reference to the accompanying drawings in which:

FIG. 1*a* is a block diagram of a first filter arrangement according to the invention;

FIGS. 1*b* to 1*f* are timing diagrams of the signals occurring at different points in FIG. 1*a;*

FIG. 2*a* is a block diagram of another filter arrangement according to the invention;

FIG. 2*b* to 2*e* are timing diagram of the signals occurring at different points in FIG. 2*a;*

Figure 3:
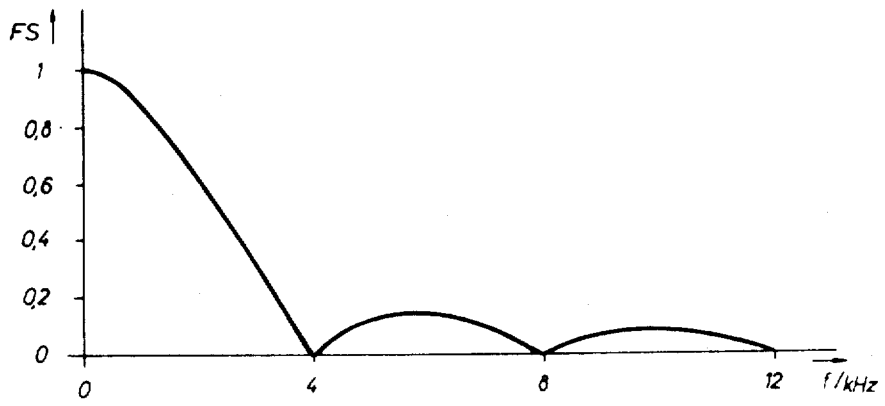
FIG. 3 shows the frequency response of the circuit arrangements of FIGS. 1*a*, 2*a* and 8*a* at constant input level.
Figure 4:
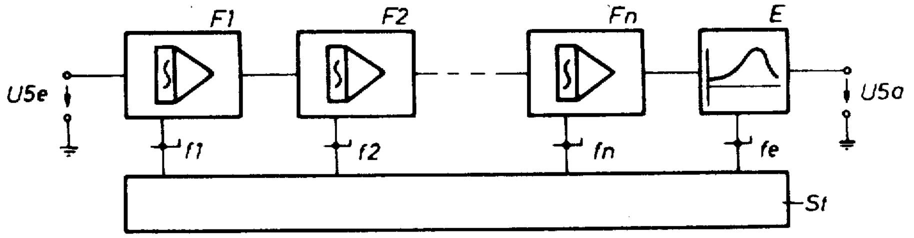
FIG. 4 is a block diagram of a multi-stage filter arrangement with filters according to FIGS. 1*a*, 2*a* or 8*a;*
Figure 9:
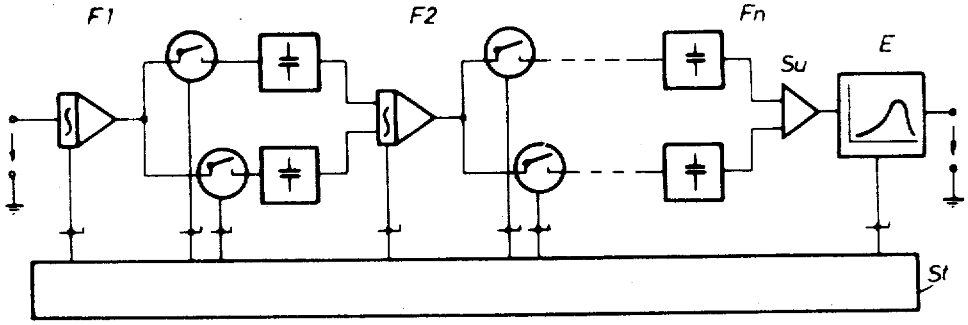
Figure 5A:
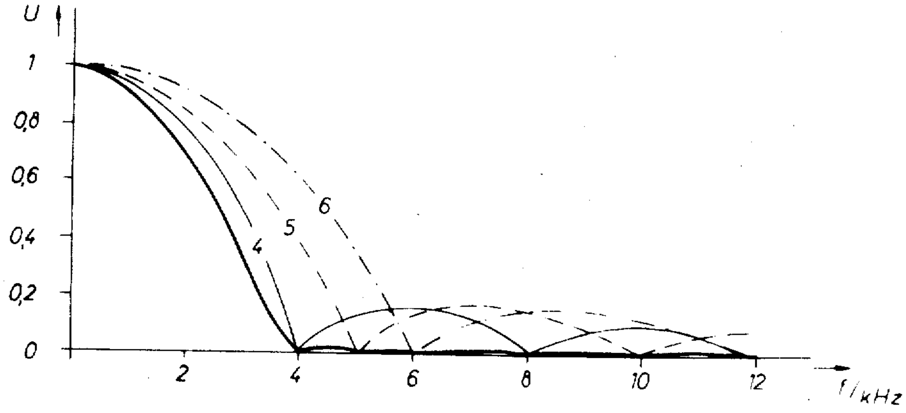
Figure 5B:
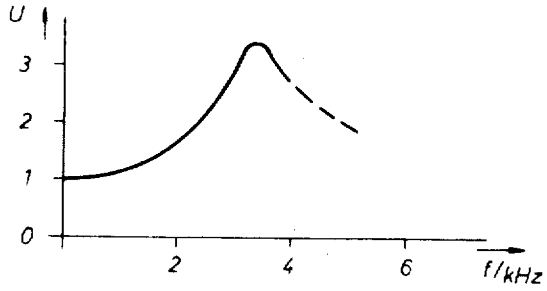

FIG. 5*a* shows the frequency response of the output signals obtained with the arrangement illustrated in FIGS. 4 or 9, for different integration durations of the individual stages;

FIG. 5*b* shows the frequency response of an equalizer which, in the useful range, generates a signal of approximately constant amplitude from the signals with a response as shown in FIGS. 3 or 5*a;*

Figure 6:
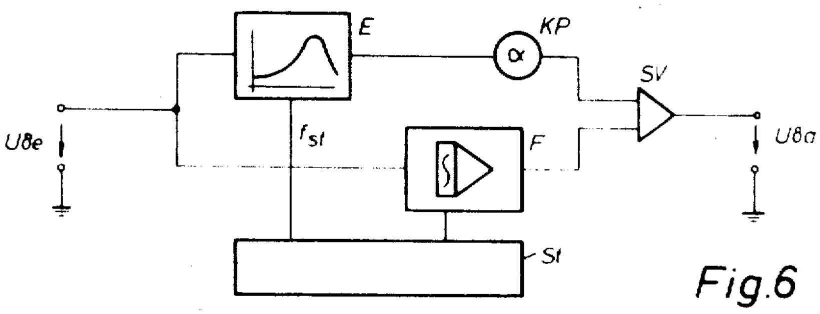
Figure 7:
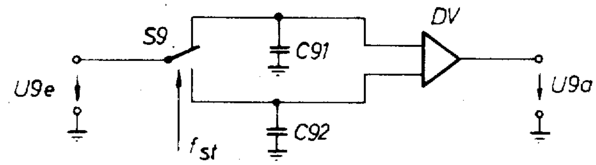

FIG. 6 is a block diagram of a modified filter arrangement with an equalizer, and FIG. 7 is a detailed block diagram of an equalizer in the form of a clock-controlled switch filter.

Figure 8A:
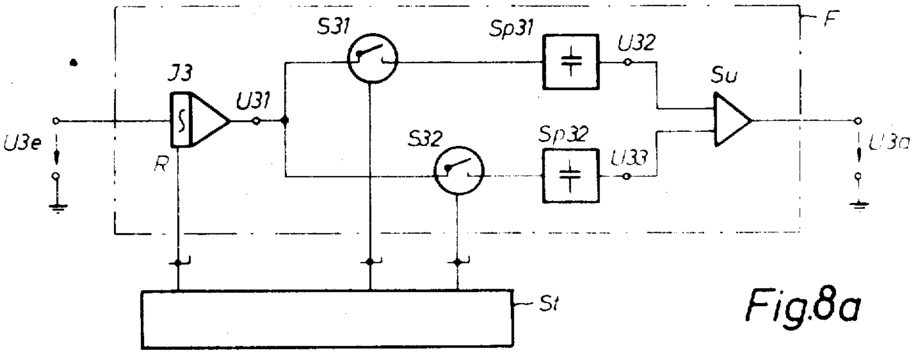

FIG. 8*a* shows a block diagram of a filter arrangement according to the invention;

FIGS. 8*b* to 8*f* show timing diagrams of the signals occurring at different points in FIG. 8*a;*

FIG. 9 shows a block diagram of a preferred embodiment of the multi-stage filter arrangement illustrated in FIG. 4.

Figure 1A:
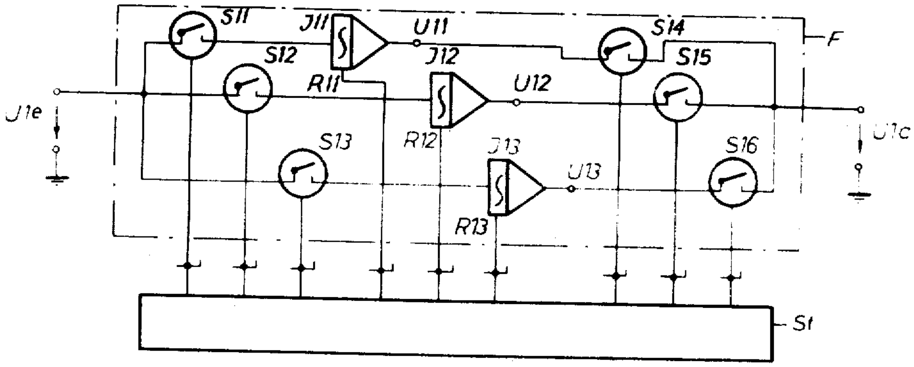
Figures 1B, 1C, 1D, 1E, 1F:
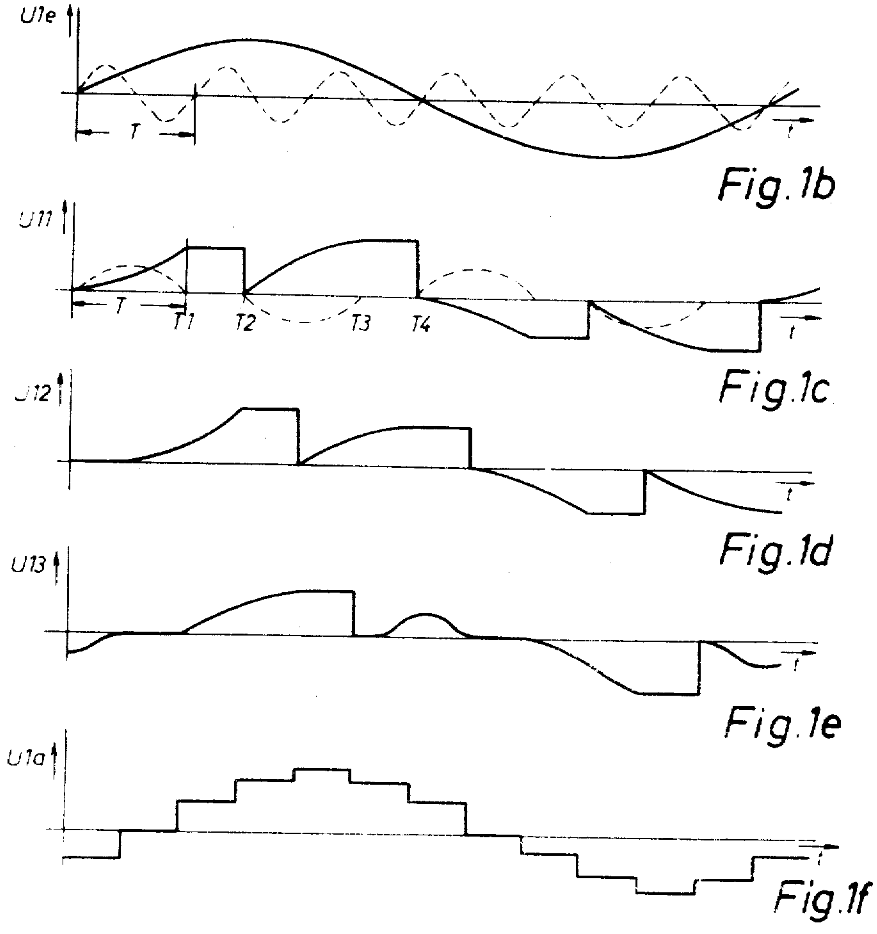

The circuit arrangement shown in FIG. 1*a* consists of a filter F to which different clock pulses are fed by a central control unit St. To explain the mode of operation, it is assumed, that an input signal Ule as illustrated in FIG. 1*b* is applied to the input of the filter F. In the particular example being described, the signal Ule consists of two sinusoidal components of different frequency. The dashed component with the cycle T is to correspond to a frequency at the attenuation pole above the cut-off frequency of the low-pass filter which is not to be transmitted. The continuous component has a longer cycle and is to be transmitted without attenuation as far as possible. The input signal Ule is applied in parallel to three branches of the filter F. Each branch consists of a first electronic switch, e.g. the switch S11 an integrator, e.g. the integrator J11, and a second electronic switch, e.g. the switch S14. The electronic switches are symbolized by contacts.

It is first assumed, that the switch S11 in FIG. 1*a* is closed during a cycle T. Then, the signal U11 at the output of the integrator J11 in the time interval from 0 to the instant T1 shows the characteristic illustrated in FIG. 1*c*. The continuously drawn component in FIG. 1*b* causes an increasing signal amplitude while the dashed component at first also causes an increasing signal amplitude and then a signal amplitude decreasing to the value 0. In reality, a sum signal appears at the output of the integrator J11, which is obtained by the continuously drawn component and the dashed component being added.

At the instant T1, the switch S11 is opened by a pulse from the control unit St; thus, a signal corresponding to the signal integral up to the time T1 of the continuously drawn components is maintained at the output of the integrator J11. This value is scanned by closing the switch S14 and appears as part of the output signal U1a. At the instant T2, the integrator J11 in FIG. 1a is reset by the central control unit St via a reset line R11, and the switch S11 is closed again while the switch S14 is opened. Thereafter, the signal U11 at the output of the integrator J11 begins to increase again with the integral value of the input signal U1e. At the next instant T3 of the opening of the switch S11, the integral value of the dashed component is back at 0. In view of this consideration, it is understandable that the dashed component of the input signal U1e has no influence on the output signal U1a. The integrator J11 is (after having been scanned again via the second switch S14) reset again at the instant T4.

The processes described so far take place in the same order in the two other branches of the filter F with the switch S12, the integrator J12, and the switch S15, and with the switch S13, the integrator J13 and the switch S16, respectively.

In FIGS. 1*d* and 1*e* it is shown that the signal U12 at the output of the integrator J12 and the signal U13 at the output of the integrator J13, respectively, occur out of phase with respect to the signals of the respective adjacent branch because the respective pilot and reset pulses are transmitted by the control unit St with a phase shift of one half cycle T in relation to one another. By the multiple symbols in the control lines of FIG. 1*a* it is indicated that a control unit St can supply many filters F.

Since in the particular example being described the integration duration is equal to the cycle T and the storage duration $T2-T1=T4-T3$ is equal to the half-cycle $T/2$, three branches in the filter F are sufficient to always be able to cyclically pass an integral value from a branch to the output.

FIG. 1*f* shows the shape of the compound output signal U1a as a function of time. The signal consists of a staircase curve whose steps corresponds to the individual integral values of the input signal U1e, which integral values have been taken from this input signal in an out-of-phase relation to one another. The staircase curve contains no component of the cycle T or of a harmonic of such an oscillation. The adjacent frequencies of the frequency of infinite attenuation and the frequencies lying between the harmonics of said adjacent frequencies are highly attenuated.

Figure 2A:
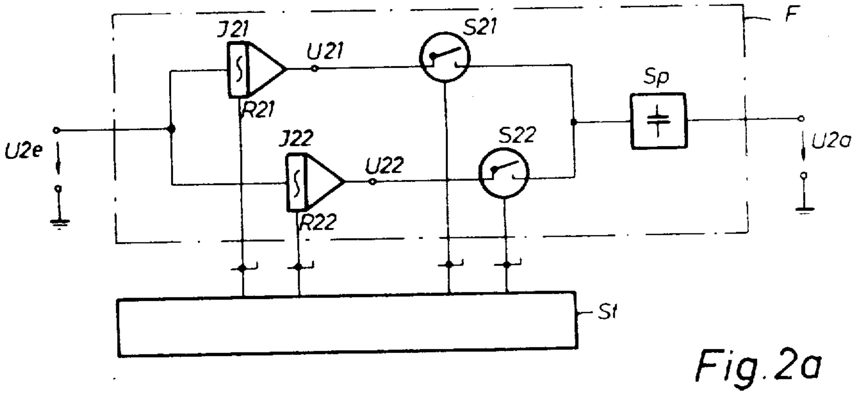
Figure 2B:
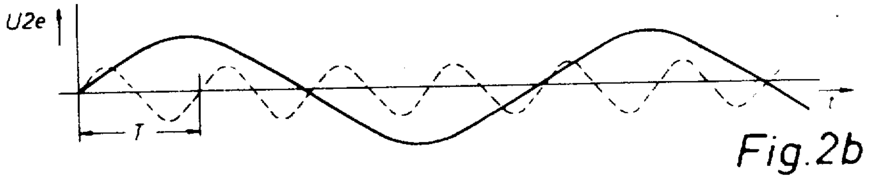

In the circuit arrangement shown in FIG. 2*a*, the filter F has only 2 branches. The input signal U2e is applied in parallel to two integrators J21 and J22. Via a switch S21, the output of the integrator J21 is connected to a storage Sp, e.g. a capacitor common to both branches. FIG. 2*b* shows the same signal components of the input signal illustrated in FIG. 1*b*. Here, too, the component with the cycle T is to correspond to the frequency at the attenuation pole of the filter F.

Figure 2C:
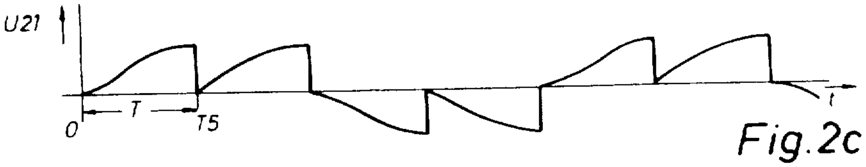

FIG. 2*c* shows the signal U21 at the output of the integrator J21. From the time $T=0$ to the instant T5, the signal U21 increases in accordance with the integral value of the continuously drawn component. At the instant T5, the integrator J21 is reset via the reset line R21 shortly after the integral value has been passed on to the storage Sp via the switch S21. The necessary synchronization between these two operations can be easily achieved by utilizing the leading edge and the trailing edge of the same pilot pulse from the control unit St. The first integration interval is periodically followed by other ones.

Figure 2D:
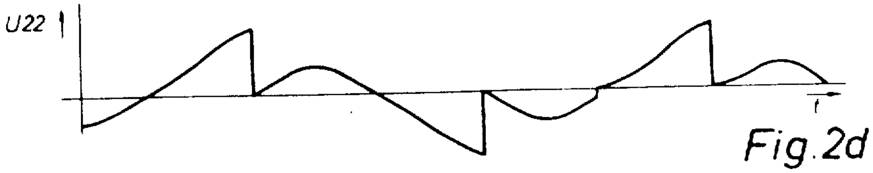

The signal U22 at the output of the integrator J22, illustrated in FIG. 2*d*, has corresponding integration intervals of the duration T but the pilot pulses on the reset line R22 for the integrator J22 and for the switch S22 are transmitted out of phase by one half cycle $T/2$ as compared to those for the first branch.

The integral values of the dashed components are not illustrated in FIGS. 2*c* and 2*d*; as in FIGS. 1*c*, 1*d* and 1*e*, they have the value 0 at the moment of scanning because a positive and a negative half-wave cancel each other in the integral.

Figure 2E:
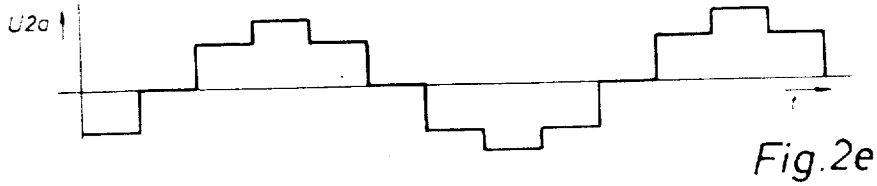

FIG. 2*e* shows the characteristic of the output signal U2a which is tapped off the storage Sp. It is composed of the superposed, intermediately stored signal integrals of the two branches to form a staircase curve as in FIG. 1*f*. Its frequency response will be explained later on with reference to FIG. 3.

The frequency spectrum FS of the output signals U1a and U2*a* of FIGS. 1*f* and 2*e* is shown in FIG. 3 in a normalized representation. The line represents the $\sin x : x$ -function. In the example being described, the attenuation poles are at the frequency 4 kHz and at their harmonics. The attenuation in the stopband between the attenuation poles is unsatisfactory for some applications.

FIG. 4 shows a circuit arrangement with several filter stages F*l* to F*n*, which are connected in series but controlled by a common control unit St, and a common equalizer E for the linearization of the frequency response in the passband. The frequency response of the individual filter stages is multiplied. In the example being described, different control frequencies *fl* to *fn* have been chosen for the integrators and electronic switches of different stages, and a control frequency *fe* has been chosen for the equalizer E, which results in an especially uniform attenuation of the stop band. This connection between the input signal U5e and the output signal U5*a* will be explained later on with reference to FIGS. 5*a* and 5*b*. Each of the filter stages Fl to Fn may correspond to either of the circuit arrangements shown in FIGS. 1*a* to 2*a*. An example of an equalizer E will be explained with reference to FIG. 7.

FIG. 5*a* shows the multiplicative effect of several series-connected filter stages of different integration duration. It is assumed that the input signal of the first stage, e.g. the input signal U5*e* in FIG. 4, has a constant level over all frequencies. Then, the thin continuous line represents the frequency response of the output signal of the first filter stage controlled with a clock frequency of 4 kHz. The dashed line shows the frequency response of the output signal of a second filter stage controlled with a clock frequency of 5 kHz with respect to a constant level at the input of the second stage. The dash-and-dot line shows the corresponding frequency response of a third filter stage controlled with a clock frequency of 5 kHz. The heavy line then shows the frequency response of the output signal of the last filter stage fn at a constant level at the input of the first of the series-connected stages. At each attenuation pole in the frequency response of one of the series-connected stages, an attenuation pole occurs in the output signal U of the last stage, too. In the ranges between the poles, the attenuation as compared to the control with only one frequency is considerably improved.

FIG. 5*b* shows the frequency response of an equalizer, with the aid of which an output signal, e.g. the output signal U5*a* in FIG. 4, with an approximately constant level in the passband of the filter can be obtained from the output signal of the last filter stage F*n*, as shown by the heavy line in FIG. 5*a*.

FIG. 6 shows an alternative to the arrangement of the equalizer in the circuit arrangement of FIG. 4. In this circuit arrangement, the input signal U8e is applied in parallel to a filter F and an equalizer E. In a summing amplifier SV, the output signal of the filter F with a falling frequency response is combined with the output signal of the equalizer E with rising frequency response, applied via a coefficient potentiometer KP. The co-efficient potentiometer KP permits a regulation of the component factor of the signal applied by the equalizer E. The output signal U8a of the summing amplifier SV has an approximately constant level in the frequency response of the passband. In FIG. 6 it is indicated that the equalizer E, too, is controlled by the central control unit St with a given control frequency $f_{St}$.

An embodiment of such an equalizer is illustrated in FIG. 7. A switch 9 is changed over with the control frequency $f_{St}$. Via this switch S9, samples of the input signal U9e are alternately fed into two capacitors C91 and C92 and buffered there. A differential amplifier DV forms the output signal U9a from the capacitor voltages. For the signal components with half the frequency of the control frequency $f_{St}$, a resonance step-up in the output signal U9a is obtained.

A plurality of circuit arrangements as shown in FIG. 6 may be connected in series as filter stages, as shown in FIG. 4.

The circuit arrangement shown in FIG. 8*a* (like that in FIG. 1*a*) consists of a filter F, to which different clock pulses are applied by a central control unit St.

The multiple symbols in the control lines indicate that a control unit St can supply many filters F.

The input signal U3e is applied to an integrator J3. The output of the integrator J3 is connected to two electronic switches S31 and S32 which are symbolically represented as contacts. The switch S31 feeds the output signal of the integrator J3 into a storage Sp31, and the switch S32 feeds it into a storage Sp32. Between these two storages and the output of the filter F, a summing element Su is inserted.

Figure 8B:
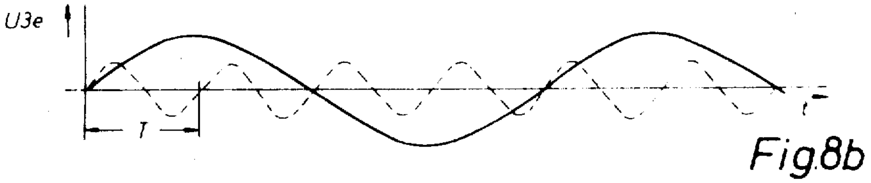

To explain the mode of operation, it is assumed that an input signal U3*e* illustrated in FIG. 8*b* is applied to the input of the filter F. In the example being described, the signal U3e consists of two sinusoidal components of different frequency. The dashed component with the cycle T is to correspond to a frequency at the attenuation pole above the cut-off frequency of the low-pass filter, which is not to be transmitted. The continuously drawn component has a longer cycle and is to be transmitted without attenuation, as far as possible.

Figure 8C:
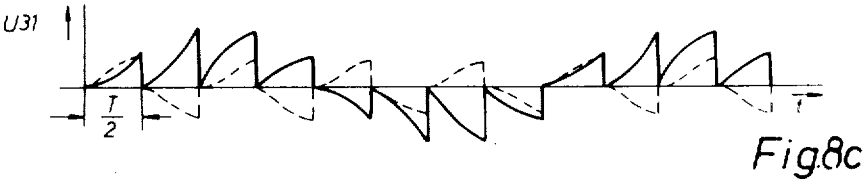

FIG. 8*c* shows the output signal U31 of the integrator J3. The integrator J3 is reset by the control unit St through a clock pulse of the cycle $T/2$.

Figure 8D:
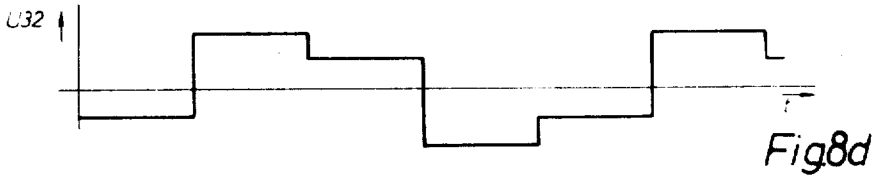
Figure 8E:
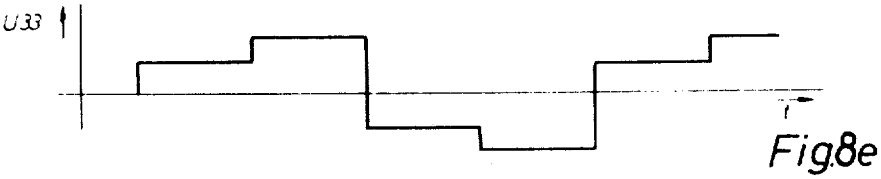

Shortly before, the integration results are in each case alternately fed into the storage Sp31 via the switch S31 and into the storage Sp32 via the switch S32, respectively. The signals U32 and U33 thereby appearing at the output of the storages Sp31 and Sp32 are illustrated in FIGS. 8*d* and 8*e*, respectively. These signals form staircase currents whose step height corresponds to each second integral value of the input signal and whose step width corresponds to the cycle T. The control pulses for the switches S31 and S32 and for the reset line R, applied out of phase with respect to each other by *T*/2, are appropriately derived from the leading and trailing edges of the same pulses.

The integral values of the dashed component of the input signal U3*e*, illustrated in FIG. 8*c*, cause a constant negative and positive voltage at the output of the storages Sp31 and Sp32, which are not shown in FIGS. 8*d* and 8*e*. In the output signal U3a, these components cancel each other. The output signal U3a is obtained by adding the signals U32 and U33 and consists of a staircase curve with the fundamental wave of the desired A.F. signals. If the method is used in time-division multiplex switching systems, the staircase curve is not disturbing because only such frequency components have been added which are obtained during a PAM signal sampling, anyhow.

Figure 8F:
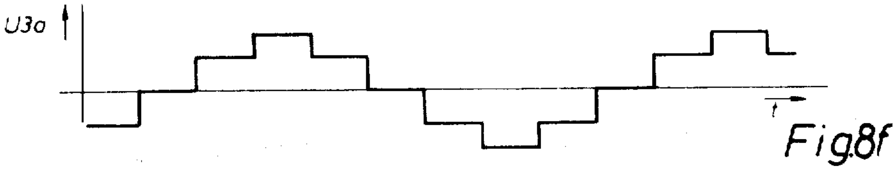

The frequency spectrum FS of the output signal U3*a*, shown in FIG. 8*f*, is shown in FIG. 3 in normalized representation. In the example, the frequency spectrum has attenuation poles at the frequency 4 kHz and at its harmonics. In the passband, the frequency spectrum exhibits a somewhat more favorable shape than the known sin *x*:*x* function while in the stopband between the attenuation poles the attenuation is unsatisfactory for some applications.

Reference may be made to FIG. 4 for a showing of a circuit arrangement with several filter stages F*l* to F*n*, the functions of which have been explained previously.

If integrators with two inputs are chosen for the filter stages F2 to F*n*, the terminating summing element may be saved in the first stage F*l* to F*n*—1, as indicated in FIG. 9. The functions of these summing elements is taken over by the integrator of the respective following stage. Only the last stage F*n* requires a summing element Su before the equalizer E.

FIG. 5*a* shows the multiplicative effect of several series-connected filter stages of different integration duration. This figure has been previously explained.

What is claimed is:

1. A method of filtering an A.F. band out of a wide-band input signal in a time-division multiplex telephone switching system comprising receiving an input signal, routing said input signal over each of a plurality of parallel transmission paths, selecting fixed time intervals to provide a time period having a duration corresponding in length to the period of signals near the center of said AF band, integrating said input signal in each of said paths at different time intervals selected to be out of phase in relation to one another by half the duration of said time intervals, storing the thus obtained integral values for a half-duration of said time intervals and providing an output signal formed by summing the stored integral values to form a periodic sequence.

2. A circuit arrangement for filtering an AF band out of a wide band input signal in a time-division multiplex switching system comprising means receiving an input signal, means for routing said input signal over each of a plurality of parallel transmission paths, means including electronic clock-controlled switches in each parallel transmission path for feeding the input signal out of phase, said signal being delayed one half cycle in a first path and an additional one half cycle in each successive path and in each case for a full cycle duration to each of a plurality of integrators, second clock-controlled electronic switches via which the output of one integrator is in each case alternately connected to the output of the circuit arrangement during a half-cycle after the opening of the associated first switch.

3. A circuit arrangement according to claim 2 in which two integrators are coupled to the input signal in parallel and which, out of phase in relation to one another by one half cycle, are reset after each cycle, and two associated electronic switches via which the signal integral is transmitted to a storage at the end of each integration cycle and immediately prior to the resetting of the integrator.

4. A circuit arrangement according to claim 2, in which, an equalizer is connected to each filter stage, said equalizer compensating for undesired frequency responses of the filter stage in the passband.

5. A circuit arrangement according to claim 2, in which, several filter stages of equal integration duration are connected in series.

6. A circuit arrangement according to claim 2, in which several filter stages of unequal integration duration are connected in series.

7. A circuit arrangement according to claim 4, in which a common equalizer is connected to a ladder of filter stages.

8. A circuit arrangement according to claim 2, in which an equalizer is connected in parallel to said filter, and one input of a summing amplifier is connected to the output of said filter and the other input of said summing amplifier is connected to the output of said equalizer via a coefficient potentiometer.

9. A circuit arrangement according to claim 8, in which the equalizer is designed as a controlled switch filter, and in which a differential amplifier (DV) combines the voltages of two capacitors to form the output signal of said equalizer.

10. A method of filtering an A.F. band out of a wide-band input signal as claimed in claim 1, in which the time intervals are selected to have a duration corresponding to one-half the period of said signals near the center of said A.F. band, and the succesively obtained integral values are separately stored for the double integration duration.

11. A circuit arrangement for filtering an AF band out of a wide band input signal in a time-division multiplex switching system comprising means receiving an input signal, means for routing said input signal over each of a plurality of parallel transmission paths, means including an integrator in each parallel path to which the input signal is constantly applied and which is reset by clock control after each of a plurality of fixed periods of time, a plurality of buffer stores, an electronic switch associated with each buffer store to which the integral value from one of said integrators is alternately fed shortly before the resetting of said integrator, and a summing element which forms the output signal from said alternately stored integral values.

12. A circuit arrangement according to claim 11, in which an equalizer compensating for the undesired frequency response is connected to said filter stage.

13. A circuit arrangement according to claim 11, in which several filter stages of equal integration duration are connected in series.

14. A circuit arrangement according to claim 11, in which several filter stages of unequal integration duration are connected in series.

15. A circuit arrangement according to claim 13, in which a common equalizer is connected to a ladder of filter stages.

16. A circuit arrangement according to claim 11, in which an equalizer is connected in parallel to said filter, and one input of a summing amplifier is connected to the output of said filter and the other input of said summing amplifier is connected to the output of said equalizer via a coefficient potentiometer.

17. A circuit arrangement according to claim 16, in which said equalizer is designed as a controlled switch filter in which the input voltage with the double frequency of the frequency of infinite attenuation of said filter is alternately fed to one of two capacitors and in which a differential amplifier combines the voltages of said capacitors to form the output signal of said equalizer.

18. A circuit arrangement for filtering an AF band out of a wide band input signal in a time-division multiplex switching system comprising means receiving an input signal, means including electronic clock-controlled switches for feeding the input signal out of phase by one half cycle and in each case for a full cycle duration to each of a plurality of integrators, second clock-controlled electronic switches via which the output of one integrator is in each case alternately connected to the output of the circuit arrangement during a half-cycle after the opening of the associated first switch, an equalizer connected in parallel to said integrators, a first plurality of input terminals of a summing amplifier connected to the outputs of said integrators, another input of said summing amplifier connected to the output of said equalizer via a coefficient potentiometer, said equalizer including means functioning as a controlled switch fileter, and said equalizer including a differential amplifier to combine the voltages of two capacitors to form the output signal of said equalizer.

19. A circuit arrangement for filtering an AF band out of a wide band input signal in a time-division multiplex switching system comprising means receiving an input signal, means including an integrator to which the input signal is constantly applied and which is reset by clock control after each of a plurality of fixed periods of time, two buffer stores, an electronic switch associated with each buffer store to which the integral value is alternately fed shortly before the resetting of said integrator, a summing amplifier to form an output signal from said alternately stored integral values, an equalizer connected in parallel to said integrator, means connecting one input of said summing amplifier to the output of said integrator, and means connecting another input of said summing amplifier to the output of said equalizer via a coefficient potentiometer, said equalizer including a controlled switch filter in which the input voltage with the double frequency of the frequency of infinite attenuation of said filter is alternately fed to one of two capacitors and the differential amplifier serving to combine the voltages of said capacitors to form the output signal of said equalizer.

* * * * *